United States Patent [19]

Kirk et al.

[11] Patent Number: 5,612,008
[45] Date of Patent: Mar. 18, 1997

[54] PROCESS FOR TREATING SOLID WASTE CONTAINING VOLATILIZABLE INORGANIC CONTAMINANTS

[76] Inventors: Donald W. Kirk, 7 Coates Hill Crt., R.R. #1, Bolton, Ontario, Canada, L7E 5R7; John W. Graydon, 3 Mossom Place, Toronto, Ontario, Canada, M6S 1G4

[21] Appl. No.: 507,887

[22] Filed: Jul. 27, 1995

[51] Int. Cl.$^6$ ............................................. C01G 37/00
[52] U.S. Cl. ............................ 423/60; 588/231; 423/88; 423/97; 423/107
[58] Field of Search ......................... 588/231; 423/60, 423/88, 97, 107, 44, 108, 59, 149; 75/748, 961, 752

[56] References Cited

U.S. PATENT DOCUMENTS

| | | | |
|---|---|---|---|
| 1,973,590 | 7/1931 | Weaton et al. | 23/148 |
| 3,958,985 | 5/1976 | Anderson | 75/117 |
| 4,092,152 | 5/1978 | Berbely | 75/7 |
| 5,093,103 | 3/1992 | Jochum et al. | 423/659 |
| 5,245,120 | 9/1993 | Srinivasacher et al. | 588/256 |

OTHER PUBLICATIONS

High Purity antimony Trichloride and Antimony Oxide From stibnite Ores, Abstract 84: 182186e, *Chemical Abstracts*, vol. 84, 1976.
Antimony Trichloride, Abstract 85: 194874m, *Chemical Abstracts*, vol. 85, 1976.
Refining of a Metal Sulfide Melt, Abstract 88: 26157y, *Chemical Abstracts*, vol. 88, 1978.
Extraction of Antimony from Minerals, Abstract 89: 13313y, *Chemical Abstracts*, vol. 89, 1978.
Stripping of Antimony by Chloridation Roasting from Mixed Tetrahedrite, Abstract 91: 24681c, *Chemical Abstracts*, vol. 91, 1979.
Selective Elimination of Impurities in Complex Minerals, Abstract 93:223715h, Chemical Abstracts, vol. 93, 1980.
Extraction of Antimony from Ores, Abstract 93:208120s, *Chemical Abstracts*, vol. 93, 1980.
Beneficiation of oxidized Iron Ore, Abstract 94:125188q, *Chemical Abstracts*, vol. 94, 1981.
Treating Deep Sea Nodules by Segregation Roasting, Abstract 99:179569, *Chemical Abstracts*, vol. 99, 1983.
Recovering Metal Values from Materials Containing Copper and/or Precious Metals, Abstract 102:223984z, *Chemical Abstracts*, vol. 102, 1985.

*Primary Examiner*—Deborah Jones
*Assistant Examiner*—Amy M. Harding
*Attorney, Agent, or Firm*—Bereskin & Parr; Philip Mendes da Costa

[57] ABSTRACT

A process for the removal of volatilizable inorganic contaminants from solid waste is provided. The process comprises the steps of: (a) providing solid waste containing volatilizable inorganic contaminants; (b) heating the waste to a temperature sufficiently high for the volatilization of the inorganic contaminants and sufficiently low so as to prevent slag formation of the solid waste, thereby producing a contaminant-rich vapor phase and a contaminant-poor solid phase; and (c) separating the solid phase and the vapor phase.

20 Claims, 1 Drawing Sheet

PROCESS FOR TREATING SOLID WASTE CONTAINING VOLATILIZABLE INORGANIC CONTAMINANTS

FIELD OF THE INVENTION

The present invention relates to a process for treating solid waste containing inorganic contaminants and, more particularly, to a process for the volatilization of inorganic contaminants from solid waste.

BACKGROUND OF THE INVENTION

Each year, hundreds of millions of tons of inorganic solid waste, such as dust, sludges and other residues, are produced as by-products of industrial operations such as thermal power generation, incineration and other waste treatment processes, metal production and refining, and various manufacturing processes. Often, these solid wastes are considered to be hazardous or potentially hazardous to the environment, due to the presence of inorganic contaminants, such as lead, cadmium, zinc, mercury, antimony, arsenic or other environmentally sensitive contaminants, in the solid wastes.

Currently, such contaminated wastes are generally disposed of, untreated, directly into a hazardous landfill site. This method of disposal is becoming increasingly costly, and less acceptable to the public as an appropriate method for disposal of contaminated waste material. Several alternative methods of disposal have been proposed. Of these, the most advanced technologies involve immobilization of the contaminant-containing waste. Such immobilization processes generally involve encapsulating the entire mass of contaminant-containing waste in cement, lime- or silica-based materials, thermoplastics, bitumen, paraffin, polymers or glass.

Such immobilization processes actually increase the total volume of waste to be disposed of. Further, it is not possible to recover and recycle the hazardous contaminants after such an immobilization process, even though these contaminants can often be reused in other industrial processes.

While there have been several attempts to provide a method of treating these inorganic wastes whereby the contaminants are recoverable, such attempts have suffered from certain disadvantages. For example, U.S. Pat. No. 5,093,103 discloses a process for separating off volatile compounds from a mixture of solid particles comprising heating the particles in a reaction space via indirect electric heaters until the particles have a temperature of 1350° C. whereby some of the volatile compounds are evaporated and the non-evaporated residue is melted. As can be expected, this process has large energy requirements, because of the necessity of forming a melt of the solid particles. Also, because of the high corrosivity of such particles at the required temperature of 1350° C., any furnace to carry out this process must be made of specialty steels. Further, as the bulk of the particles have been formed into a melt, the treated particles cannot be reutilized.

SUMMARY OF THE INVENTION

It is an object of the present invention to provide an improved process for treating solid waste which contains volatilizable impurities which overcomes the disadvantages of the prior art.

According to the present invention, there is provided a process for treating solid waste which contains at least one volatilizable inorganic contaminant, the process comprising the steps of:

(a) providing solid waste containing at least one volatilizable inorganic contaminant;

(b) heating the waste to a temperature sufficiently high for the volatilization of the at least one inorganic contaminant and sufficiently low so as to prevent slag formation of the solid waste, thereby producing a contaminant-rich vapor phase and a contaminant-poor solid phase; and (c) separating said solid phase and said vapor phase.

DETAILED DESCRIPTION OF THE PREFERRED EMBODIMENT

Figure 1:
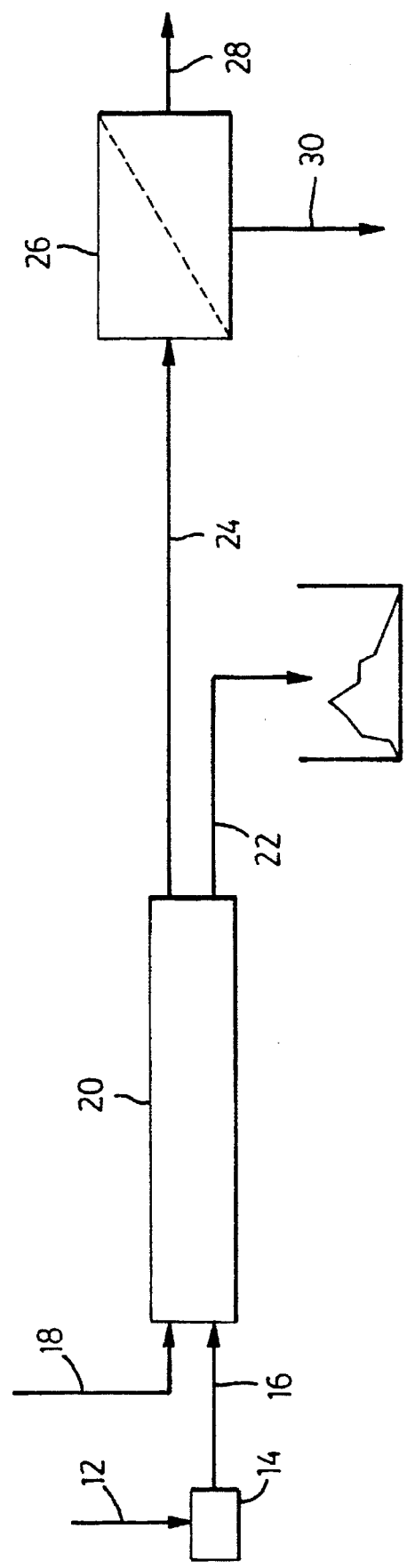
FIG. 1 is a schematic view of an embodiment of the present invention.

The present invention relates to a process for treating solid waste containing volatilizable inorganic contaminants. The process of the present invention is most suitable for inorganic wastes such as fly ash, geothermal waste sludges and water treatment sludges. Typically, these solid wastes include heavy metal contaminants such as lead, cadmium, zinc, mercury and arsenic.

A preferable waste is fly ash, which is composed principally of silicates and is produced as a byproduct of thermal power generation and other industrial processes. An important source of fly ash is municipal solid waste incineration. Such fly ash can contain up to about 5% lead and 1% cadmium (all percentages given herein are on a weight basis).

It has surprisingly been found that such inorganic contaminants can be removed from such solid wastes by heating the waste to a temperature sufficiently high for the volatilization of the inorganic contaminants but below the temperature of slag formation of the solid waste. It is important to avoid slag formation, as the residual material then retains its original consistency. The residual material is thus easier to handle and to dispose of and further becomes potentially useful, in applications such as engineered fill, as a raw material for ceramics, and for addition to cement or concrete as an inert material.

While the required temperature obviously varies depending on the type of waste and the type and amount of contaminants, temperatures in the range of 650°–1200° C. are typically suitable. Preferably, the waste is heated to a temperature between about 850° and about 1150° C. and most preferably is heated to a temperature of about 1000° C.

By heating a solid waste to such a temperature, the contaminants are vaporised, resulting in a contaminant-rich vapor phase and a contaminant-poor solid phase. By contaminant-poor, it is meant that no more than 10 percent of the original contaminants remain in the solid phase. Preferably, the solid phase will contain no more than 5 percent of the original contaminants. Most preferably, the solid phase will contain no more than 3 percent of the original contaminants.

As mentioned above, the solid phase retains the consistency of the original waste material. For example, if the waste is fly ash, which usually is a powder, the solid phase would also be a powder. This allows for easy handling of the solid phase, and for potential re use of the solid phase.

In order to be able to recover the contaminants once volatilized, the process of the present invention is preferably carried out in an enclosed environment. For example, the process of the present invention may be carried out in a furnace or a rotary kiln. In particular, the process of the present invention may be carried out in an electric furnace, a multiple hearth furnace or a vertical shaft furnace. The waste can be heated directly by gas combustion or in an electrically heated furnace or in-an externally heated furnace.

While the present invention may be carried out on either a continuous basis or on a batch basis, continuous processing is preferable, due to its ability to treat larger amounts of wastes. Batch processing is nevertheless suitable for treatment of small quantities of solid wastes, for example up to a few hundred kilograms.

A sufficient residence time is needed in order to ensure that the solid phase emerges contaminant poor. Typically, residence times in the order of 1–24 hours are sufficient for processing most types of solid wastes. The residence time required will depend on the temperature reached and the presence of additives in the solid waste.

With certain types of solid wastes, it may be desirable to pre-process the waste in order that the process of the present invention may be more efficiently carried out. For example, fly ash is generally a powdery solid and is more easily handled when pelletized. Also, if the waste has a significant quantity of combustibles, a pre-oxidation step may be appropriate.

Also, it may be desirable to include a pretreatment stage, in which an alkali or alkaline metal salt is added to the waste prior to heating. The level of addition of the metal salt is preferably about two to three times the concentration of the contaminant being removed—i.e. if the waste contains 3% lead, about 6–9% metal salt is added. Preferably, the metal salt is selected from the group consisting of chlorides and sulphates of sodium, magnesium, potassium, calcium, and iron. More preferably the salt is selected from the group consisting of calcium chloride, potassium chloride and sodium chloride, and most preferably the salt is calcium chloride. The addition of such a metal salt generally increases the recovery of the contaminants at given process conditions, or alternatively allows for the use of lower temperatures or shorter processing times to achieve a desired recovery.

As discussed above, the process of the present invention produces a contaminant-poor solid phase and a contaminant-rich vapor phase. The contaminants are preferably recovered from the vapor phase by condensation. This may be done by using a cooling chamber, i.e., a chamber with cool walls, and the contaminants can then be scraped from the walls. Alternatively, cooled baffle plates may be hung in the flow path of the contaminants and these can be removed when sufficient contaminant has been deposited. A further alternative is to quench the gas containing the contaminants with a water spray, thereby dissolving the contaminants in water. A yet further alternative is to scrub the gas in water, thereby producing a contaminant-rich water stream. Contaminant recovery is most conveniently carried out from the dry condensed contaminants.

The condensed contaminants are primarily the chloride salts of potassium and sodium with minor amounts of environmentally important metal chlorides. Ideally, separation might recover potassium or potassium and sodium chlorides with less than 1 percent of other metal salts. In a pure state, potassium chloride is a marketable commodity and potassium and sodium chlorides could, for example, be used in deicing applications if not contaminated with heavy metals.

One convenient separation method would involve the precipitation of all of the contaminants with the exception of potassium and sodium from a solution of the condensed contaminants. Precipitants which could be used as additives in this separation method include sulphide salts, hydrogen sulphide, carbonates, phosphates or sulphates, the latter being useful for the removal of lead.

Alternatively, selective extraction using lixivants or ion exchange might be used. Selective crystallisation from the concentrated salt solution might be used in combination with the above.

Alternatively, the individual contaminants can be separated into component fractions during condensation. This may be accomplished by providing a series of baffle plates maintained at different temperatures.

Also, during the process of the present invention, there may be a simultaneous transformation of some of the contaminants of the waste into a less hazardous form. For example, the metals such as lead may form lead silicate or phosphate. If this occurs, the amount of highly hazardous waste is then further reduced.

The products of the process of the present invention are therefore a relatively large amount of a contaminant-poor solid waste and a small amount of highly concentrated inorganic contaminants. These concentrated contaminants can either be disposed of or can be used as raw materials for further processing. The treated solid waste, having had such hazardous contaminants removed, is now environmentally benign, with no potential future toxic liability, and can either be safely disposed of in a landfill site or can be used for construction material, cement addition or engineered fill.

FIG. 1 shows a schematic view of one embodiment of the process of the present invention. Waste 10, which is preferably fly ash, has added to it a metal salt 12. The waste 10 and the metal salt 12 can be mixed together in a mixer 14. Alternatively, a solution of the metal salt can be sprayed onto the waste 10.

The metal salt-waste mixture 16 then enters a rotary kiln 20, where the mixture is heated, in this embodiment by a hot gas stream 18. In FIG. 1, the flow of gas stream 18 is concurrent, but could also be countercurrent. The flow and temperature of gas stream 18 are sufficient to heat the waste to the desired temperature, as described above, thereby volatilizing the inorganic contaminants. The effluent streams from the kiln 20 are a contaminant-poor solid stream 22 and a contaminant-rich vapour stream 24. Stream 24 then enters a condensation/separation vessel 26, from which the effluent is a cooled gas stream 28 and a solid contaminated salts phase 30.

EXAMPLE 1

Various 3 g samples of MSW (municipal solid waste) fly ash were heated for 3 hours in a quartz tube furnace (Carbolite model T2f 1217) at temperatures of 800°, 900°, 950° and 1050° C. The sample was introduced into the furnace at room temperature and the furnace was then heated to the desired temperature. A stream of air at 100 cm$^3$ per minute was passed over the samples, allowing the components volatilized during the heating stage to be separated. The air stream was cooled and passed through an absorbing of dilute nitric acid solution to collect the volatile components. The volatile components were analyzed by atomic absorption spectroscopy and some comparison analyses were analyzed by induced coupled plasma spectroscopy.

The analysis of the volatile components showed that many of the heavy metals as well as some less toxic metals had been removed from the samples. At 1000° C., the collected volatile material contained 8670 µg of Pb, 2340 µg of Cu, 7830 µg of Zn, 291 µg of Cd, 18 µg of Cr, 228 µg of Mn, 6 µg of Ni, 285 µg of Mg, 22600 µg of K, and 22800 µg of Na.

EXAMPLE 2

Various 3 g samples of MSW fly ash were processed at 1000° C. using the apparatus of Example 1, with residence times in the furnace of 0, 0.5, 1.0, 2.0 and 3.0 hours (in addition to the time required to heat the furnace to the desired temperature).

The amount of metal contaminant removed from the sample increased with an increase of residence time from 0 hour to 0.5 hour as follows: Pb 10%; Cu by 51%; Zn 15%; Cd 15%.

From 0.5 hour to 3 hours residence time, increases in recovery were less significant, with the exception of Cu for which longer holding times were found to be beneficial. Thus, from 0.5 hour residence time to 3 hours residence time, the measured increases in removal were as follows: Pb 1.5%; Cu 62%; Zn 0±1%; Cd 0±1%.

EXAMPLE 3

To various 3 g MSW fly ash samples were added the following amounts of calcium chloride salt: 0.156 g; 0.23 g; 0.39 g; 0.47 g; 0.63 g; and 0.78 g. These samples were then heated in the furnace of Example 1 at 1000° C. for 3 hours.

The removal of Pb from the sample increased from 8670 µg, with no salt addition, to 10,230 µg with addition of 0.78 g of salt. For Cu, the best addition amount was 0.63 g of salt which increased the removal of copper from 2340 µg, with no salt addition, to 3090 µg. For Zn, the removal increased from 7830 µg, with no salt addition, to 24600 µg with 0.63 g salt. The removal of Cd increased from 291 µg to 378 µg with 0.78 g salt.

It was found that the addition of salt also increased the removal of Mn by 11 times, of Ni by 29 times, of K by 2 times and of Na by 3 times.

EXAMPLE 4

A 3 g sample of MSW fly ash to which was added 0.63 g of calcium chloride, was heated in the furnace of Example 1 at a temperature of 1000° C., with a residence time of 3 hours. The percentage removal of the contaminants was determined by analyzing the original fly ash, the treated fly ash residue and the captured volatilized contaminants. The residue was digested using concentrated nitric acid plus hydrofluoric acid. This solution was then diluted for atomic absorption spectroscopy and induced coupled plasma spectroscopy.

Approximately 0.6 g of volatile material was captured. The percentage removal of the contaminants was as follows:

Pb 95%
Cu 87%
Zn 96%
Cd 98%

With this level of contaminant removal, the remaining material can be classified as non-hazardous.

Although the present invention has been described in conjunction with preferred embodiments, it is to be understood that modifications and variations may be resorted to without departing from the spirit and scope of the invention as those skilled in the art will readily understand. Such modifications and variations are considered to be written the purview and scope of the invention and appended claims.

We claim:

1. A process for separating volatilizable contaminants from solid waste which contains at least one volatilizable inorganic contaminant, the process comprising the steps of:
   (a) providing solid waste containing at least one volatilizable inorganic contaminant;
   (b) providing a chlorine source;
   (c) heating the waste and the chlorine source to a temperature sufficiently high for the volatilization of the at least one inorganic contaminant and sufficiently low so as to prevent slag formation of the solid waste, to produce a contaminant-rich vapor phase including a chloride of the at least one inorganic contaminant and a contaminant-poor solid phase;
   (d) separating said solid phase from said vapor phase while said chloride is in said vapor phase; and,
   (e) recovering said chloride from said vapor phase subsequent to step (d).

2. The process as claimed in claim 1 wherein said chlorine source comprises chlorine containing compounds in the waste.

3. The process as claimed in claim 1 wherein said chlorine source comprises a metal salt.

4. The process as claimed in claim 3 wherein said metal salt is selected from the group of alkali metal salts and alkaline metal salts.

5. The process as claimed in claim 3 wherein said metal salt is selected from the group consisting of chlorides and sulphates.

6. The process as claimed in claim 3 wherein said metal salt is selected from the group consisting of chlorides of sodium, magnesium, potassium, calcium and iron.

7. The process as claimed in claim 3 wherein the amount of said metal salt added to said waste ranges from about two to about three times the concentration of said contaminants in the waste.

8. The process as claimed in claim 1 further comprising the step of further treating the vapour phase to recover the at least one inorganic contaminant.

9. The process as claimed in claim 8 wherein the waste contains at least two volatilizable inorganic contaminants and the at least two inorganic contaminants are selectively recovered.

10. The process as claimed in claim 1 further comprising the step of subjecting said vapor phase to a condensation process to produce a concentrated stream of said chloride.

11. The process as claimed in claim 1 further comprising the step of subjecting said vapor phase to a scrubbing process.

12. The process as claimed in claim 1 further comprising the step of recovering a concentrated stream of the chloride from the vapor phase.

13. The process as claimed in claim 1 wherein said heating step comprising heating the waste and the chlorine source to a temperature in the range of about 650° C. to about 1200° C.

14. A process for recovering volatilizable inorganic contaminants from solid waste, the process comprising the steps of:

(a) providing solid waste containing at least one volatilizable inorganic contaminant;

(b) heating the waste to a temperature sufficient to volatilize the at least one inorganic contaminant while preventing slag formation of the waste to produce a contaminant-rich vapor phase including at least one salt of the at least one volatilizable inorganic contaminant and a contaminant-poor solid phase;

(c) separating said solid phase from said vapor phase while said salt is in said vapor phase; and, (d) recovering said salt from said vapor phase subsequent to step (c).

15. The process as claimed in claim 14 further comprising the step of adding a metal salt to the waste prior to the heating step.

16. The process as claimed in claim 15 further comprising the step of further treating the vapour phase to recover the at least one inorganic contaminant.

17. The process as claimed in claim 16 wherein more than 90% of the at least one inorganic contaminant in the waste is recovered.

18. The process as claimed in claim 15 further comprising the step of subjecting said vapor phase to a condensation process.

19. The process as claimed in claim 15 further comprising the step of recovering a concentrated stream of the salt of the at least one inorganic contaminant from the vapor phase.

20. The process as claimed in claim 14 wherein said waste comprises a fly ash.

* * * * *